United States Patent

Yamaguchi et al.

[11] Patent Number: 5,837,770
[45] Date of Patent: Nov. 17, 1998

[54] PROCESS FOR PRODUCING FLAME RETARDANT THERMOPLASTIC POLYESTER RESIN COMPOSITION

[75] Inventors: Noboru Yamaguchi, Ichihara; Tohru Fujiki, Sodegaura, both of Japan

[73] Assignee: Sumitomo Chemicial Company, Limited, Osaka, Japan

[21] Appl. No.: 600,873

[22] Filed: Feb. 13, 1996

[30] Foreign Application Priority Data

Feb. 22, 1995 [JP] Japan .................................. 7-033480

[51] Int. Cl.⁶ ...................................................... C08L 67/00
[52] U.S. Cl. ......................... 524/513; 524/516; 524/517; 524/524; 523/523; 523/500; 523/526
[58] Field of Search .................................... 524/513, 516, 524/517, 524; 523/500, 523, 526

[56] References Cited

U.S. PATENT DOCUMENTS 4,172,859  10/1979  Epstein .................................... 428/402

FOREIGN PATENT DOCUMENTS

| 0078020 | 5/1983 | European Pat. Off. . |
| A0092776 | 11/1983 | European Pat. Off. . |
| A-0376613 | 7/1990 | European Pat. Off. . |
| A0527493 | 2/1993 | European Pat. Off. . |
| 52-32045 | 9/1975 | Japan . |
| WO9209658 | 6/1992 | WIPO . |
| WO9509884 | 4/1995 | WIPO . |

OTHER PUBLICATIONS

Derwent Abstract JP 6100766, Apr. 12, 1994.
Derwent Abstract JP3020351, Jan. 29, 1991.

*Primary Examiner*—Mark L. Warzel
*Attorney, Agent, or Firm*—Sughrue, Mion, Zinn, Macpeak & Seas, PLLC

[57] ABSTRACT

A process for producing a flame retardant thermoplastic resin composition which has an excellent flame retardancy while maintaining sufficiently high levels of mechanical properties including tensile property, flexural property and impact resistance which process comprises the following first step and second step:

the first step: the step of melt-kneading the following components (A) and (B) to obtain a melt-kneaded composition (AB), the second step: the step of melt-kneading the melt-kneaded composition (AB) and the following component (C) to obtain the flame retardant thermoplastic polyester resin composition:

component (A): an impact resistance improver,
component (B): a flame retarder,
component (C): a thermoplastic polyester resin.

11 Claims, No Drawings

PROCESS FOR PRODUCING FLAME RETARDANT THERMOPLASTIC POLYESTER RESIN COMPOSITION

BACKGROUND OF THE INVENTION

The present invention relates to a process for producing a flame retardant thermoplastic polyester resin composition. In more particular, it relates to a process for producing a flame retardant thermoplastic polyester resin composition which has an excellent flame retardancy while maintaining sufficiently high levels of tensile property, flexural property and impact resistance.

In general, thermoplastic polyester resins are in wide use as engineering plastics because of their excellent weather resistance, electric property, chemical resistance, abrasion resistance, heat aging resistance, etc. However, they have a drawback, or need to be improved, in the impact resistance of their molded articles; this fact stands in the way to further development of practical applications of the resin. Accordingly, various methods have hitherto been proposed to improve the insufficient impact resistance which is the drawback of thermoplastic polyester resins.

Typical examples of the methods hitherto proposed include a composition using ethylene-glycidyl methacrylate copolymer as an modifier (JP-B-58-47419), a composition using such terpolymers as ethylene-glycidyl methacrylate-methyl acrylate terpolymer as an modifier (JP-B-59-28223) and, for improving further low temperature impact resistance, a composition obtained by dry-blending ethylene-glycidyl methacrylate copolymer with ethylene-propylene random copolymer and melt-blending the resulting blend with a screw extruder (JP-B-63-4566) and a composition obtained by dry-blending ethylene-glycidyl methacrylate copolymer with ethylene-α-olefin-specific nonconjugated diene terpolymer and melt-blending the resulting blend with a screw extruder (JP-B-1-26380).

In recent years, on the other hand, in such uses as automotive parts, electric and electronic parts and household electric appliance parts, good flame resistance and flame retardancy have been strongly requested for the parts and the materials therefor. A method commonly used for imparting desired flame retardancy to thermoplastic polyester resins comprises adding a bromine-containing flame retarder or antimony-containing flame retarding auxiliary to the resins.

However, the prior methods mentioned above are unavoidably accompanied by deterioration of physical properties due to the addition of flame retarders and flame retarding auxiliaries. Thus, a big problem involved in developing a flame retardant thermoplastic polyester resin is to give a good flame retardancy to the resin together with favorable properties inherent to the thermoplastic polyester resin. In the above-mentioned prior methods, moreover, no due consideration has been given to optimizing the production process with the intention of improving the physical properties and improving the flame retardancy of the resulting resin composition. Therefore, it has been strongly desired to develop a process for producing a flame retardant thermo-plastic polyester resin which is free from such problems.

SUMMARY OF THE INVENTION

In view of the situations, the object of the present invention is to provide a process for producing a flame retardant thermoplastic polyester resin composition which has an excellent flame retardancy while maintaining sufficiently high levels of mechanical properties including tensile property, flexural property and impact resistance.

Thus, the present invention relates to a process for producing a flame retardant thermoplastic polyester resin composition which comprises the following first step (i) and second step (ii):

(i) the first step: the step of melt-kneading the following components (A) and (B) to obtain a melt-kneaded composition (AB), (ii) the second step: the step of melt-kneading the melt-kneaded composition (AB) and the following component (C) to obtain the flame retardant thermoplastic polyester resin composition.

component (A): an impact resistance improver
component (B): a flame retarder
component (C): a thermoplastic polyester resin

DETAILED DESCRIPTION OF THE INVENTION

The process of the present invention comprises the first step (i) and the second step (ii).

The first step (i) of the present invention is the step of melt-kneading the components (A) and (B) to obtain a melt-kneaded composition (AB).

The component (A) used in the present invention is an impact resistance improver.

A preferred example of the component (A) includes an epoxy group-containing ethylene copolymer and a mixture of two or more thereof. More specifically, the component (A) may be a copolymer comprising 50–99% by weight of ethylene units (a1), 0.1–30% by weight of unsaturated carboxylic acid glycidyl ester units (a2) and/or unsaturated glycidyl ether units (a3) and 50% by weight or less of ethylenically unsaturated ester units (a4), a copolymer comprising 70–99% by weight of the units (a1) and 1–30% by weight of the units (a2) and/or (a3), or a mixture of two or more kinds of the copolymers.

The unsaturated carboxylic acid glycidyl ester unit (a2) referred to above is preferably a structural unit represented by the following formula (1)

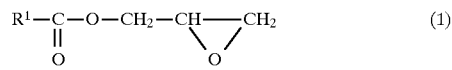 (1)

wherein $R^1$ is a hydrocarbon group of 2–18 carbon atoms having an ethylenic unsaturated bond.

Specific examples of the compound having the above-mentioned structural unit include glycidyl acrylate, glycidyl methacrylate and itaconic acid glycidyl ester.

The unsaturated glycidyl ether unit (a3) referred to above is preferably a structural unit represented by the following formula (2)

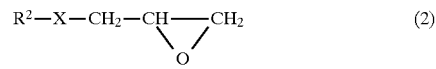 (2)

wherein $R^2$ is a hydrocarbon group of 2–18 carbon atoms having an ethylenic unsaturated bond and X is the methyleneoxy group or phenoxy group.

Specific examples of the compound having the structural unit include allyl glycidyl ether, 2-methyl-allyl glycidyl ether and styrene-glycidyl ether.

The ethylenically unsaturated ester units referred to above may include saturated carboxylic acid vinyl esters such as vinyl acetate and vinyl propionate, and α,β-unsaturated carboxylic acid alkyl esters such as methyl acrylate, ethyl acrylate, butyl acrylate, methyl methacrylate, ethyl methacrylate and butyl methacrylate. Particularly preferred among them are vinyl acetate, methyl acrylate and ethyl acrylate from the viewpoints of productivity and mechanical properties of the resin composition obtained according to the present invention. The ethylenically unsaturated ester units are structural units which may be optionally used in the present invention.

The component (A) has a melt index of preferably 0.5–100 g/10 min, more preferably 2–50 g/10 min as determined according to ASTM D1238. When the melt index is too low, the component (A) tends to be insufficiently compatible with the component (C), resulting in unsatisfactory mechanical properties of the composition obtained. When the melt index is too high, the resulting composition tends to have unsatisfactory mechanical properties.

The component (A) may be produced by known methods, for example, by copolymerizing the monomers to be copolymerized in the presence of a radical generating agent and in the presence or absence of a suitable solvent and chain transfer agent at 500–4,000 atm and 100°–300° C., or by mixing an unsaturated epoxy compound and a radical generating agent with polyethylene and subjecting the mixture to melting graft copolymerization in an extruder.

The component (A) used in the present invention may also be a combination of the above-mentioned epoxy group-containing ethylene copolymer and a rubber component.

The rubber components may be, for example, such ethylene-containing copolymers as rubbers comprising ethylene units and α-olefin units having 3 or more carbon atoms and rubbers further comprising nonconjugated diene units, that is, comprising ethylene units, α-olefin units having 3 or more carbon atoms and nonconjugated diene units, e.g., ethylene-propylene rubber, ethylene-propylene-nonconjugated diene rubber, ethylene-butene rubber, ethylene-butadiene rubber and the like; styrene-containing rubbers, e.g., styrene-butadiene rubber, SBS rubber, hydrogenated SBS rubber, liquid-polymerized styrene-butadiene rubber and the like; or polyisobutylene rubber, butyl rubber, butadiene rubber, isoprene rubber, alfine rubber, nitrile rubber, fluoro rubber, vinyl-pyridine rubber, silicone rubber, butadiene-methyl methacrylate rubber, acrylic rubber, urethane rubber, epichlorohydrin rubber, chlorobutyl rubber and bromobutyl rubber. These rubber components may be used in admixture with one another. They may also be modified with maleic anhydride, halogen compounds, vinyl compounds or acrylic compounds so long as the modification does not exert adverse effects, e.g., occurrence of excessive reaction between the above modifiers and the epoxy group-containing ethylene copolymer.

The rubber component and the epoxy group-containing ethylene copolymer may be mixed by dry-blending the respective components with other desired components and then melt-blending the resulting blends with a screw extruder; or they may be mixed by first melt-blending the rubber component and the epoxy group-containing ethylene copolymer to obtain a mixture, dry-blending the mixture with other desired components, and melt-blending the resulting blend with a screw extruder.

The contents of the rubber component and the epoxy group-containing ethylene copolymer in the component (A) ranges preferably 80% by weight or less and 20% by weight or more, respectively, more preferably 70% by weight. or less and 30% by weight or more, respectively. When the content of the epoxy group-containing ethylene copolymer is less than 20% by weight, the pellets of the mixture obtained tend to stick to one another, leading to difficulty in handling.

The melt-blended product of the rubber component and the epoxy group-containing ethylene copolymer may be obtained by melt-blending the two in a closed type kneader, such as Banbury mixer, pressure kneader and heated roll mill to obtain a blend in the form of block and then processing the block into the form of pellets by using an extruder. In the melt-blending using a Banbury mixer or the like, suitable amounts of various additives, colorants, fillers, etc. may be optionally added.

The component (B) used in the present invention is a flame retarder.

The component (B) is a flame retarder commonly used for making thermoplastic resins flame retardant. Specific examples thereof include bromine-containing flame retarders such as brominated epoxy oligomer, brominated polycarbonate, brominated phenoxy resin, brominated polystyrene, brominated acrylate, brominated imide, brominated diphenyl oxide, ethylenebis-pentabromobiphenyl and the like, chlorine-containing flame retarders, fluorine-containing flame retarders and nitrogen-phosphorus-containing flame retarders. Preferred examples of the component (B) include brominated epoxy oligomers, more specifically, brominated epoxy oligomers having an epoxy equivalent of 300–3,000 mm eq./kg, number average molecular weight of 500–5,000, bromine content of 40–70% by weight and softening point of 40°–200° C.

The first step (i) of the present invention is the step of melt-kneading the components (A) and (B) to obtain a melt-blended composition (AB).

The method used for melt-blending the components (A) and (B) are not particularly restricted. The step (i) may be conducted by uniformly melt-kneading the two components by using, for example, a single screw extruder. Thus the melt-kneaded composition (AB) used in the present invention is obtained.

The second step (ii) of the present invention is the step of melt-kneading the above-mentioned melt-kneaded composition (AB) and the component (C) to obtain a flame retardant thermoplastic polyester resin composition.

The component (C) refers to thermoplastic polyester resins, which are preferably obtained from dicarboxylic acids and diols.

Examples of the dicarboxylic acids which can be used include aliphatic dicarboxylic acid having 2–20 carbon atoms such as azelaic acid, adipic acid, sebacic acid and dodecanedicarboxylic acid; aromatic dicarboxylic acids such as terephthalic acid, isophthalic acid, orthophthalic acid, diphenyl-4,4-dicarboxylic acid, diphenylethane-4,4-dicarboxylic acid and naphthalene-dicarboxylic acid; and alicyclic dicarboxylic acid such as cyclohexanedicarboxylic acid. These acids may be used each alone, or as a mixture of two or more thereof, of which preferably at least 40% by mole is terephthalic acid.

Examples of the diols include aliphatic or alicyclic glycols having 2–20 carbon atoms such as ethylene glycol, 1,3-propanediol, 1,4-butanediol, 1,5-pentanediol, 1,6-hexanediol, 1,10-decanediol and 1,4-cyclohexane diol. The diols may be used each alone or as a mixture of two or more thereof.

Preferred examples of the component (C) include polyethylene terephthalate and polybutylene terephthalate. Preferred are those which have an intrinsic viscosity of 0.5–3.0 dl/g as determined in o-chlorophenol as a solvent at 25° C. When the intrinsic viscosity is too low or two high, the resulting resin composition tends to have an insufficient mechanical strength.

The method used for melt-kneading the melt-kneaded composition (AB) and the component (C) is not particularly limited. The melt-kneading may be conducted by uniformly melt-kneading the two components by conventional methods used for melt-kneading thermoplastic resins, for example, by use of a single-screw or twin-screw extruder, Banbury mixer, roll, and various kneaders. The melt-kneaded composition may be subjected to the second step (ii) immediately after having been obtained in the first step (i) or alternatively, after having been obtained in the first step (i), may be once cooled, stored and thereafter subjected to the second step (ii).

Thus, the flame retardant thermoplastic polyester resin composition in the present invention is obtained.

The relative amounts of the components (A), (B) and (C) used in the present invention is preferably (1 to 100):(1 to 100):100, more preferably (3 to 60):(3 to 60): 100 in terms of the weight ratio of (A):(B):(C). Substantially all of the amounts of the respective components used in the process of the present invention are ultimately contained in the flame retardant thermoplastic polyester resin composition produced. When the amount of the component (A) is too small, the resulting resin composition tends to have an insufficient impact resistance. When the amount of the component (B) is too small, the resulting resin composition tends to have an insufficient flame retardancy. When the amount of the component (C) is too small, the resulting resin composition tends to have unsatisfactory mechanical properties.

In the present invention, flame retarding auxiliaries such as antimony-containing compounds, may be optionally used in combination with the component (B). The flame retarding auxiliary may be added at the time of melt-blending the components (A) and (B).

In the present invention, the first step (i) and the second step (ii) described above are indispensable steps. When, for example, the components (A), (B) and (C) are kneaded all together without recourse to the present invention, a sufficiently high flame retardancy cannot be obtained.

The flame retardant thermoplastic polyester resin composition in the present invention may, if necessary and desired, be incorporated with various additives and the like conventionally added to thermoplastic resins, e.g., heat stabilizers, antioxidants, weather-proofing agents, light stabilizers, nucleating agents, lubricants, mold release agents, pigments, flame retarders, fillers and reinforcing agents such as glass fiber.

The flame retardant thermoplastic polyester resin composition obtained by the present invention, by virtue of its excellent characteristic properties, is suitably used in a wide field of applications including, for example, automotive parts, electric and electronic parts, household electric appliance parts, information communication instruments, interior and exterior finishing materials, packaging materials, industrial materials and sundry goods.

EXAMPLES

Example 1

A mixture of 15.5 parts by weight of an ethylene (64% by weight)-glycidyl methacrylate (6% by weight)-methyl acrylate (30% by weight) copolymer (having a melt index of 9.0 g/10 min as determined according to ASTM D1238) as the component (A), and 15.5 parts by weight of a brominated epoxy oligomer (having an epoxy equivalent of 1,000, number average molecular weight of 2,000, bromine content of 51% by weight and softening point of 130° C.) as the component (B), was melt-kneaded by use of a 30 mmφ single screw extruder to obtain a melt-kneaded composition (the first step). Then, the whole amount of the melt-kneaded composition, 100 parts by weight of polybutylene terephthalate (trade name: TUFPET PBT N1000, mfd. by Mitsubishi Rayon Co., Ltd.), as the component (C), 58 parts by weight of Glasslon chopped strand (trade name: CS03-MA419, mfd. by Asahi Fiber Glass Co., Ltd.) and 5 parts by weight of antimony trioxide were melt-kneaded with a 30 mm twin-screw extruder (barrel temperature: 230° C., screw rotation speed: 200 rpm, feed rate: 12 kg/hr) to obtain a polyester resin composition (the second step). The polyester resin composition was evaluated in the following manner. Table 1 shows the conditions and the results of the evaluation.

Methods of evaluation

The test pieces used for the evaluation were molded by using an injection molding machine (IS100EN-3AV 5 oz, mfd. by TOSHIBA CORP.) under conditions of cylinder set temperatures of 260°, 260°, 250°, 240° and 220° C., die temperature of 70° C. and cooling time of 30 sec.

(1) MFR (melt flow rate)

The MFR was determined according to ASTM D1238 under the following conditions:

Component (A): 190° C., 2160 g

Compositions: 250° C., 2160 g (2) Tensile properties

The tensile properties were determined according to ASTM D638 (specimen thickness: 1/8 inch).

(3) Flexural properties

The flexural properties were determined according to ASTM D790 (specimen thickness: 1/8 inch).

(4) Impact strength

The impact strength was determined according to ASTM D256 (specimen thickness: 1/8 inch, measuring temperature: −30°, −10°, 0°, 23° C.).

(5) Flame retardancy

The flame retardancy was determined according to UL 94.

Comparative Example 1

The whole amounts of the components (A), (B) and (C), Glasslon chopped strand and antimony trioxide, respectively the same as used in Example 1, were melt-kneaded all together by using a 30 mmφ twin-screw extruder (barrel temperature: 230° C., screw rotation number: 200 rpm, feed rate: 12 kg/hr), to obtain a polyester resin composition. The polyester resin composition was evaluated in the same manner as in Example 1. Table 1 shows the conditions and results of the evaluation.

The results obtained reveal the following. In Example 1, wherein melt-kneading was conducted in separate steps of the first step and the second step according to the process of the present invention, the resin composition obtained is excellent in flame retardancy. On the other hand, in Comparative Example 1, wherein the components (A), (B) and (C) were melt-kneaded all together without using the first step and the second step, the composition obtained is poor in flame retardancy.

TABLE 1

|  | Example 1 | Comparative Example 1 |
|---|---|---|
| Composition (parts by wt.) | | |
| (A) *1 | 15.5 | 15.5 |
| (B) *2 | 15.5 | 15.5 |
| (C) *3 | 100 | 100 |
| GF *4 | 58 | 58 |
| Sb$_2$O$_3$ *5 | 5 | 5 |

TABLE 1-continued

|  | Example 1 | Comparative Example 1 |
|---|---|---|
| Process *6 | Separate | Together |
| Results of evaluation | | |
| MFR (g/10 min) | 12 | 15 |
| Tensile properties | | |
| Ultimate strength (US) (kg/cm$^2$) | 1040 | 1020 |
| Ultimate elongation (UE)(%) | 3.4 | 3.8 |
| Flexural properties | | |
| Flexural modulus (FM) (kg/cm$^2$) | 79400 | 78400 |
| Flexural strength (FS) (kg/cm$^2$) | 1640 | 1620 |
| Impact resistance (kg · cm/cm) | | |
| −30° C. | 6.6 | 6.7 |
| −10° C. | 7.8 | 8.2 |
| 0° C. | 8.2 | 9.1 |
| +23° C. | 10 | 11 |
| Flame retardancy | V-1 | Unacceptable |

Note:
*1 (A): ethylene (86.2 wt %)-glycidyl methacrylate (12 wt %)-vinyl acetate (1.8 wt %) copolymer (melt index determined according to ASTM D1238: 3.0 g/10 min.)
*2 (B): brominated epoxy oligomer (epoxy equivalent: 1000, number average molecular weight: 2,000, bromine content: 51 wt %, softening point: 130° C.)
*3 (C): polybutyrene terephthalate (trade name: TUFPET PBT N1000, mfd. by Mitsubishi Rayon Co., Ltd.)
*4 GF: Glasslon chopped strand (trade name: CS03-MA419, mfd. by Asahi Fiber Glass Co., Ltd.)
*5 Sb$_2$O$_3$: antimony trioxide
*6 Process: Separate: Melt-kneading was conducted in separate steps of the first step and the second step according to the present invention. Together: All of the components were melt-kneaded together.

As set forth above, according to the present invention, there can be provided a process for producing a flame retardant thermoplastic polyester resin composition which has an excellent flame retardancy while maintaining sufficiently high levels of mechanical properties including tensile property, flexural property and impact resistance.

What is claimed is:

1. A process for producing a flame retardant thermoplastic polyester resin composition comprising a first step (i) and second step (ii);
wherein
   (i) the first step comprises melt-kneading the following components (A) and (B) to obtain a melt-kneaded composition (AB); and
   (ii) the second step comprises melt-kneading the melt-kneaded composition (AB) and the following component (C) to obtain the flame retardant thermoplastic polyester resin composition; wherein component (A), component (B), and component (C) are as follows:
   component (A): an impact resistance improver comprising at least one epoxy group-containing ethylene copolymer,
   component (B): a flame retarder, and
   component (C): a thermoplastic polyester resin.

2. The process according to claim 1, wherein the component (A) is selected from the group consisting of:
   an epoxy group-containing ethylene copolymer comprising ethylene (a1) and unsaturated carboxylic acid glycidyl ester (a2) and/or unsaturated glycidyl ether (a3), and
   a mixture of two or more kinds of said epoxy group-containing ethylene copolymers.

3. The process according to claim 2, wherein the epoxy group-containing ethylene copolymer further comprises ethylenically unsaturated ester (a4) other than said unsaturated carboxylic acid glycidyl ester (a2).

4. The process according to claim 1 wherein the component (B) is a brominated epoxy oligomer.

5. The process according to claim 4 wherein the brominated epoxy oligomer has an epoxy equivalent of 300–3000 mm eq./kg, number average molecular weight of 500–5000, bromine content of 40–70% by weight and softening point of 40°–200° C.

6. The process according to claim 1 wherein the component (C) is polyethylene terephthalate and/or polybutylene terephthalate.

7. The process according to claim 1 wherein the ratio of the amounts of the components (A), (B) and (C) used is (1 to 100):(1 to 100): 100 in terms of the weight ratio of (A):(B):(C).

8. The process according to claim 3 wherein the epoxy group-containing ethylene copolymer comprises:
   50–99% by weight of ethylene units (a1),
   0.1–30% by weight of unsaturated carboxylic acid glycidyl ester units (a2) represented by the formula (1):

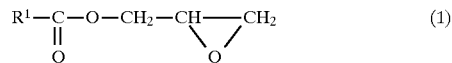

wherein R$^1$ is a hydrocarbon group of 2–18 carbon atoms having an ethylenic unsaturated bond,
   and/or unsaturated glycidyl ether units (a3) represented by the formula (2):

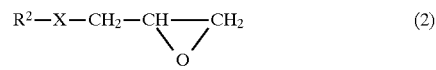

wherein R$^2$ is a hydrocarbon group of 2–18 carbon atoms having an ethylenic unsaturated bond and X is the methyleneoxy group or phenoxy group, and
   50% by weight or less of ethylenically unsaturated ester units (a4) selected from the group consisting of vinyl acetate, methyl acrylate and ethyl acrylate.

9. The process according to claim 2 wherein the epoxy group-containing ethylene copolymer comprises:
   70–99% by weight of ethylene units (a1), and
   1–30% by weight of unsaturated carboxylic acid glycidyl ester units (a2) represented by the formula (1):

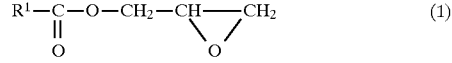

wherein R$^1$ is a hydrocarbon group of 2–18 carbon atoms having an ethylenic unsaturated bond,
   and/or unsaturated glycidyl ether units (a3) represented by the formula (2):

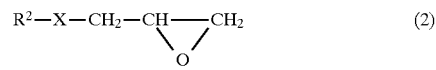

wherein R$^2$ is a hydrocarbon group of 2–18 carbon atoms having an ethylenic unsaturated bond and X is the methyleneoxy group or phenoxy group.

10. The process according to claim 1, 2, 3, 8, or 9 wherein the component (A) has a melt index of 0.5–100 g/10 min when determined at 190° C. under a load of 2,160 g.

11. The process according to claim 1, 4 or 5 wherein the first step (i) further comprises adding a flame retarding auxiliary.

* * * * *